United States Patent Office 3,694,393
Patented Sept. 26, 1972

3,694,393
METHOD OF PRODUCING PAPER, AND PAPER OBTAINED
Sheldon N. Lewis, Willow Grove, Richard F. Merritt, Fort Washington, and William D. Emmons, Huntingdon Valley, Pa., assignors to Rohm and Haas Co., Philadelphia, Pa.
No Drawing. Original application Apr. 4, 1969, Ser. No. 813,724. Divided and this application Sept. 13, 1971, Ser. No. 180,154
Int. Cl. C08f *3/64, 3/66, 15/26*
U.S. Cl. 260—29.6                  9 Claims

ABSTRACT OF THE DISCLOSURE

This invention is concerned with the making of paper, including paperboard, which is sized and/or has improved wet strength. For example, there is added to a paper pulp, such as in the beater, a monomer of the formula

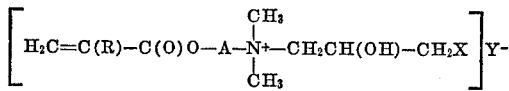

wherein X is a chlorine atom,
R is H or $CH_3$,
A is an alkylene group and
Y is an anion or a polymer of such monomer, at a pH of 3 to 10, optionally with an additional aqueous polymer dispersion.

---

This application is a division of our application Ser. No. 813,724, filed Apr. 4, 1969.

DESCRIPTION OF THE INVENTION

In accordance with the invention, a method of making an improved paper is provided comprising mixing into paper pulp about 0.05% to 7% by weight solids, based on the weight of fibers, of a product obtained by reacting an epihalohydrin with a polymer of an amine salt of the Formula I $$H_2C=C(R)C(O)O—A—N(CH_3)_2 \cdot HY$$

wherein
R is hydrogen or methyl,
X is chlorine, bromine, or iodine, and
A is a $(C_2-C_6)$alkylene group having at least two carbon atoms in a chain between the adjoined O to N atoms or A may be a polyoxyethylene group of the formula $(CH_2CH_2O)_xCH_2CH_2$ wherein $x$ is 1 to 11 or more, and
Y is an anion, at room temperature to 80° C. in an aqueous medium at a pH of 2 to 6, and subsequently forming the pulp into a sheet. In a preferred embodiment, the polymer obtained in the manner described is activated before introduction into the pulp by bringing it at a solids concentration of about 2% to about 10% to a pH of 9–12 just prior to use and maintaining it at that pH for 1–5 hours at 5–50° C.

In accordance with the present invention, a hydrogen acid salt of a basic ester of the formula $$H_2C=C(R)—C(O)O—A—N(CH_3)_2 \cdot HY \quad (I)$$

is reacted under acid conditions with an epihalohydrin of the formula

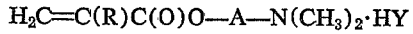
(II)

the symbols in the formula being as follows:
X is chlorine, bromine, or iodine,
R is hydrogen or methyl, A is a $(C_2-C_6)$alkylene group having at least two carbon atoms in a chain between the adjoined O to N atoms or A may be a polyoxyethylene group of the formula $(CH_2CH_2O)_xCH_2CH_2$ wherein $x$ is 1 to 11 or more, and Y is an anion, such as a halogen ion ($Cl^-$, $Br^-$, or $I^-$) or the anion of any other acid, such as phosphate, acid phosphate, sulfate, bisulfate, methyl sulfate, carboxylate, sulfonate, sulfamate, acetate, formate, oxalate, acrylate, and α-methacryloxyacetate. Preferably, Y is the anion of an acid having an ionization constant, $pK_a$ of 5.0 or less, i.e. a dissociation such that the hydrogen ion concentration is at least $10^{-5}$.

The reaction may be effected at room temperature to about 80° C. Generally, the procedure should be controlled to prevent the temperature exceeding about 80° C., preferably avoiding temperatures above 50° C. The reaction is most conveniently carried out in aqueous media, preferably water itself. The starting salts and the epihalohydrin are adequately water-soluble to make water entirely suitable as the reaction medium. The epihalohydrin is preferably used in stoichiometric amount or in excess thereof. The aqueous medium may contain an auxiliary water-miscible solvent when A is an alkylene group of 4 or more carbon atoms. No catalyst is needed for the reaction. It is, however, essential that the pH be maintained on the acid side during the reaction to prevent undesirable side reactions. The reaction is rapid even when started at room temperature. Its completion can be readily determined by following the drop in amine titre as the amine group is quaternized. Generally, the addition of epihalohydrin to the aqueous starting salt solution is made at as rapid a rate as is consistent with the control of the temperature in the reaction system.

A polymerization inhibitor may be present in the reaction medium. Examples include monomethyl ether of hydroquinone, hydroquinone and phenothiazine. The amount of inhibitor may be from 0.01% to 1% based on the weight of the starting salt.

The carbon atoms of the A group of Formula I may be in a simple straight chain or may be in branched-chain arrangement. However, it is preferred that the carbon atom of A that is attached directly to the nitrogen atom has at least one hydrogen attached directly to it to assure that the reaction is not sterically hindered. One of the hydrogen atoms in one or more or all of the ethylene groups of the polyoxyethylene group representing A may be replaced by a methyl group.

The epihalohydrin may be epiiodohydrin or epibromohydrin, but is preferably epichlorohydrin. Similarly, the salt of the polymer may be any of the hydro acid salts, such as hydroiodide or hydrobromide, but is preferably the hydrochloride. One or both of the methyl groups on the nitrogen atom may be cyclohexyl or another alkyl group, but the compound of Formula I in which these groups are both methyl reacts so much more rapidly with the epihalohydrin than that in which they are ethyl that it is believed the dimethyl compound is the best one from a practical standpoint.

The monomeric products of the present invention have the following formula in which the symbols are the same as defined hereinabove.

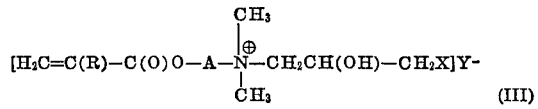
(III)

They are obtained in high yield (over 90%) in aqueous reaction medium. The products of the reaction may be concentrated or even isolated from the reaction medium in which they are dissolved by vaporization of the water, preferably under vacuum. However, they can be stored in the form of their aqueous solutions as obtained.

The products are polymerizable and for this purpose, their aqueous solutions may be used directly. Any known polymerization initiator of free radical type effective in aqueous systems can be used. Examples are t-butyl hydroperoxide, ammonium persulfate, and alkali metal persulfates, such as those of sodium or potassium. They are used at the customary dosage of 0.1 to 2% by weight, based on monomer weight. They may be used with sodium hydrosulfite or other reducing agents in redox systems. Instead, the polymerization may be effected by radiation.

These new quaternary ammonium salt monomers may be copolymerized with other polymerizable ethylenically unsaturated monomers, especially by emulsion polymerization procedures, using the initiators or redox systems just mentioned in conjunction, if desired, with suitable emulsifiers of nonionic or cationic type. As emulsifiers, there may be used t-octyl- or t-nonyl-phenoxypolyethoxyethanols having from about 10 to 50 or more oxyethylene groups, octadecylamine sulfate, cyclohexyldiethyl(dodecyl) amine sulfate, octadecyltrimethylammonium bromide, polyethoxyamines or mixtures of two or more such emulsifiers.

Any ethylenically unsaturated monomer having a group $H_2C=C<$ may be used for copolymerization with the new monomers of Formula III under conditions such that the polymerization medium is maintained at an acid condition, preferably at a pH of not over 6. Examples of monoethylenically unsaturated monomers having a single $H_2C=C<$ group include vinyl esters of $(C_1-C_{18})$aliphatic acids, such as vinyl acetate, laurate, and stearate; esters of acrylic acid or methacrylic acid with $(C_1-C_{18})$alcohols, including $(C_1-C_{18})$alkanols, benzyl alcohol, cyclohexyl alcohol, and isobornyl alcohol, such as methyl acrylate or methacrylate, ethyl acrylate or methacrylate, butyl acrylate or methacrylate, 2-ethylhexyl acrylate or methacrylate, octadecyl acrylate or methacrylate; vinyl aromatic hydrocarbons (e.g., styrene, isopropenyl toluene, and various dialkyl styrenes); acrylonitrile, methacrylonitrile, ethacrylonitrile, and phenylacrylonitrile; acrylamide, methacrylamide, ethacrylamide, N-methylol acrylamide, N-monoalkyl and -dialkyl acrylamides and methacrylamides, e.g., N-monomethyl, -ethyl, -propyl, -butyl, and N-dimethyl, -ethyl, -propyl, -butyl, etc. alkacrylamides, e.g., N-monophenyl- and -diphenyl-acrylamides and -methyacrylamides; vinyl ethers, such as butyl vinyl ether; N-vinyl lactams such as N-vinyl pyrrolidone; and olefins, such as ethylene; fluorinated vinyl compounds, such as vinylidene fluoride; β-hydroxyethyl acrylate or methacrylate or any of the hydroxyl-containing or amine-containing monomers mentioned in columns 2 and 3 of U.S. Pat. 3,150,112; vinyl chloride and vinylidene chloride; alkyl vinyl ketones; e.g., methyl vinyl ketone, ethyl vinyl ketone, and methyl isopropenyl ketone; itaconic diesters containing a single $CH_2=C<$ grouping, e.g., the dimethyl, diethyl, dipropyl, dibutyl and other saturated aliphatic monohydric alcohol diesters of itaconic acid, diphenyl itaconate, dibenzyl itaconate, di-(phenylethyl) itaconate; allyl, and methallyl esters of saturated aliphatic monocarboxylic acid, e.g., allyl and methallyl acetates, allyl and methallyl propionates, allyl and methallyl valerates; vinyl thiophene; 4-vinyl pyridine; and vinyl pyrrole.

The monomers of Formula III are directly useful for copolymerization with acrylonitrile to modify the antistatic, dyeing, and moisture-regain properties thereof. The resulting copolymer containing 0.2 to 5% by weight of the quaternary ammonium compound of the present invention can be formed into fibers which can be formed into textile yarns and fabric which show reduced tendency to develop static charges on frictional contact, better dyeing, especially by acid dyes, and better feel because of increased moisture adsorption or regain. Instead of copolymerizing the monomer of the invention directly with the acrylonitrile to form the main component of fibers or films, a homopolymer or copolymer of the monomer of Formula III with one or more other monomers, such as vinyl acetate, ethyl acrylate, styrene or vinyl benzene sulfonate, may be blended in relatively small amount with the acrylonitrile polymer which forms the predominant components of the fiber or film that is subsequently formed from the blend.

A compound of Formula III may be used for the sizing of paper. A small amount in the range of 0.2 to 5% or more by weight of the compound based on dry fiber weight, may be mixed into the paper pulp in the beater or shortly before or after the pulp leaves the beater. A polymerization initiator may be added to the pulp at the same time or shortly before or after the addition of the monomer of Formula III. The effect obtained in the dry paper produced therefrom varies in dependence on the pH of the system. If the pulp is at a pH of less than 7, the paper obtained shows a sizing effect. If the pulp is neutral or alkaline or is rendered alkaline, such as at a pH of 8 to 10, at some point prior to drying of the formed sheet, increased wet strength is also obtained.

In either case an aqueous dispersion of neutral or acid-containing polymers such as poly(ethyl acrylate) obtained by emulsion polymerization may also be added to the pulp. In such event the monomer of Formula III, or a polymer formed thereof in situ serves to anchor the additional polymer to the fibers. Instead of such additional polymer, there may be added an aqueous dispersion of a wax, such as polyethylene, of a pigment or mineral filler, or of a material, such as a long chain alcohol-modified urea formaldehyde resin, which on subsequent calendaring of the paper serves to transparentize it.

An alternative method of preparing the polymers of the present invention is to react an epihalohydrin with a polymer containing from 0.25% to 100% by weight of an amine salt of Formula I supra. Such polymer may be obtained by polymerizing the amine salt of Formula I directly or by polymerizing the corresponding amine in free base form and then neutralizing it with a hydrogen acid to form the salt of the amine polymer. Numerous methods of polymerizing (including copolymerizing within the meaning of this term) the amine salts of Formula I and the corresponding amines in free base form are well known and any of these methods may be used. Conventional emulsion or suspension polymerization techniques may be employed. Any of the comonomers listed above for copolymerization with the quaternary ammonium compound of Formula III may be used as comonomers with the amine salts of Formula I or the corresponding amine in free base form.

The reaction of the epihalohydrin and the polymer salt may be carried out in the same way and under the same conditions as that of the epihalohydrin and the monomer of Formula I. The polymer may be dissolved in water or it may be present in the form of an aqueous latex obtained by emulsion polymerization. The epihalohydrin is used in the stoichiometric equivalent proportion to convert whatever proportion of amine units in the polymer to quaternary ammonium units that is desired, or a slight excess (up to 25%) may be used.

Reaction of the amine salt polymer (whether homopolymer or copolymer) with the epihalohydrin provides a polymer having units containing quaternary ammonium groups of the formula

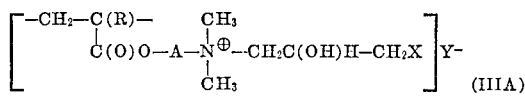

along with some units of the formula

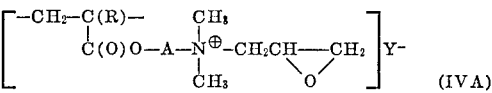

The relative amounts of III-A and IV-A will vary depending on the exact reaction conditions but, in a typical case, they will be present in roughly equivalent amounts.

Lowering of the pH apparently reduces the proportion of IV-A. At pH values of 6 or less, the propensity for gelation attributable to the glycidyl group of IV-A is inhibited whereas raising the pH to the neutral or alkaline conditions results in rapid curing of the copolymer even at room temperature to an insoluble condition, the higher the pH and concentration of the polymer the more rapid the curing. Apparently, the groups III-A are converted to IV-A groups when the pH is made alkaline and the alkali-catalyzed transformations of the glycidyl groups can cause cure and insolubilization of the polymer.

If, however, the polymers of the present invention containing the functionality IIIA are diluted to very low solids (2–10%) in water at 5–50° C., then the pH may be raised to 9–12 without gelation. The polymer so obtained is stable for a limited amount of time at low solids (2–10%) even though such a polymer cannot be stored indefinitely without gelation or loss of functionality. Polymers of the present invention when activated by this caustic treatment for a minimum period of 1–5 hours have been found two to three times more efficient as wet-weight strength resins than they are prior to activation. This caustic activation process is of particular significance since polymers treated in such a way have special value as wet strength resins for paper when the paper is cured at a pH of 6–10. While the caustic activation process is not practical for the polymer manufacturer because of the previously mentioned stability problems and the required low solids (2–10%), it can be practical for the polymer user, such as a paper mill.

These properties of the polymers containing Groups III-A with or without nominal levels of the groups IV-A enable the polymer manufacturer to make reasonably stable polymer compositions, such as latices thereof, and store and ship them to a user, such as a paper manufacturer, for application under any conditions of pH, e.g. at a pH of 2 to 5 for simple sizing, or at a pH of 7 to 11 or higher to cure the polymer in the paper to develop high wet strength.

Homopolymers of a compound of Formula III or copolymers containing both groups III-A and IV-A are generally water-soluble to an extent of at least 1% by weight at room temperature and in most cases dissolve to form aqueous solutions containing as much as 20% or more, the greater the concentration, the greater the viscosity.

The homopolymers are generally useful as flocculants, as in the clarification of water and aqueous suspensions. Thus, the addition to a sewage of about 0.001 to 0.5% by weight, based on the weight of suspended solids, of a homopolymer of a monomer of Formula III, serves to flocculate the suspended matter and facilitate its removal by filtration or by settling and decantation. The homopolymers are thus useful in the flocculation of aqueous suspensions of many types, and especially of domestic and industrial wastes having neutral, acidic or alkaline character. As mentioned hereinbefore, they can be used as paper sizing and wet strength agents and as anchoring agents for other sizing materials applied in aqueous dispersions or suspensions. They are also effective as retention aids in the preparation of mineral filled papers wherein they enhance the anchoring of the fillers to the fibers and thereby clarify the white water obtained. The sizing and flocculation effects are generally effective at all pH values of the systems to which they are applied.

The treatment of paper pulp with the homopolymers (particularly after caustic activation) under neutral or alkaline conditions followed by beating provides a remarkable increase in wet strength. The amount of polymer applied for this purpose may range from 0.5 to 7% or more by weight, based on the dry weight of fiber in the pulp, the wet strength increasing with increases in proportion up to about 4 to 5% after which the wet strength levels off and the sizing effect increases.

The water-soluble copolymers containing 25% or more of units of Formula III-A whether or not units of Formula IV-A are also present therein and also those whose units consist essentially of units III-A and IV-A are useful for the same purposes as mentioned hereinabove for the homopolymers of a monomer of Formula III. For use as a wet-strength resin for paper, the copolymers preferably contain about 35 to 100% of units of Formula III-A and units of IV-A and for optimum performance these resins are subjected to the caustic activation process at 2–10% solids just before use.

Copolymers containing from 0.25% to 25% or more by weight of units of Formula III-A are useful for many purposes. For example, copolymers of acrylonitrile with 0.25 to 15% of units of Formula III-A are particularly useful for forming fibers and films having improved dyeability, greater resistance to the development of electrostatic charges by frictional contact, and better feel because of greater moisture adsorption. Copolymers of about 0.5% to 30% or more of a monomer of Formula III-A with an ester of acrylic acid or of methacrylic acid such as ethyl acrylate, butyl acrylate, 2-ethylhexyl acrylate, methyl methacrylate with or without styrene or vinyltoluene, are quite satisfactory for the stabilization of wool fabrics against shrinkage on washing, for the bonding of nonwoven fabrics, for the finishing of leather, as a binder for pigmented compositions, for the pigment-dyeing of textiles, for the production of mineral-coated papers, and for lithographic inks, for the sizing of paper, and as thermosetting coatings for application to metals, wood, plastics, glass, masonry of all types, plaster walls, etc.

To assist those skilled in the art to practice the present invention, the following modes of operation are suggested by way of illustration, parts and percentages being by weight and the temperature in ° C. unless otherwise specifically noted.

(1a) A 4,000 ml. round-bottom 4-neck flask fitted with a reflux condenser, 2 addition funnels, stirrer, and thermometer is charged with 2,600 g. of de-ionized water. The air is removed with a nitrogen purge and the water is heated to 55° C. One addition funnel is charged with 16 g. of ammonium persulfate dissolved in 200 g. of water. The other funnel is charged with the monomer emulsion prepared from 417 g. water, 63 g. of a 70% solution of t-octylphenoxypoly(40)ethoxyethanol, 400 g. of dimethylaminoethyl methacrylate and 400 g. of ethyl acrylate. Both monomer emulsion and initiator solutions are gradually added over a one-hour period which is appropriate to maintain the polymerization temperature at 55–56° C. The resulting aqueous polymer dispersion contains about 20% solids with a pH of 7.7. To 3,660 g. of this dispersion is added 183 g. of 37% HCl (1 equivalent). The dispersed polymer immediately becomes soluble, whereupon 220 g. (1.25 equivalent) of epichlorohydrin is added. After 24 hours at 25° C. amine titration indicates complete quaternization. The pH of the polymer solution is adjusted from 6.5 to 2 with 37 g. of 37% HCl. At this point, the resulting solution contains 24% polymer solids.

(b) The quaternary ammonium polymer solution is diluted to 5% solids with water containing 14% by weight of NaOH based on polymer solids to provide a final pH of 11. After one hour, the pH falls to 9 and within 3 hours at 25° C., the polymer is ready for use. Further ageing at alkaline pH for a limited period is not detrimental. The effect of the alkaline pretreatment on wet strength properties is given in Table 1. The procedure followed is:

(c) Bleached kraft "Alberta Hi-Brite" pulp slurry is beaten at 2.5% solids to a Canadian Standard Freeness of 470 ml. and the pulp is diluted to 1% solids and adjusted to pH 7.8 with NaOH. The polymer solutions of paragraphs (a) and (b) are added to separate batches of the pulp at 1.0% solids based on dry pulp weight. The pulp is sheeted at a final consistency of 0.04%. The sheets are then dried at 200° F. for two minutes. The wet tensile strength (lbs./in.) is determined on a Scott 1P–4 tester, after immersion in 75° F. H₂O for one hour.

TABLE 1

| Polymer used | Percent polymer on dry pulp | Wet tensile (lbs./in.) 1 day | 28 days |
|---|---|---|---|
| Paragraph (a) above | 1 | 4.1 | 7.6 |
| Paragraph (b) above | 1 | 12.5 | 14.4 |
| Kymene 557 [1]—untreated | 1 | 9.4 | 12.1 |
| Kymene 557—base treated | 1 | 6.8 | 9.1 |

[1] A commercial polyamide resin bodied with epichlorohydrin having a pH of about 4, U.S. Pat. 2,926,116

Shorter base treatment times than 3 hours or initial pH values below 11 produce polymers which provide wet strengths intermediate to those listed above.

(2) The apparatus described in procedure (1) is used and the flask is charged with 2,600 g. of de-ionized water, purged with nitrogen and heated to 55° C. One addition funnel is charged with 4 g. of ammonium persulfate dissolved in 200 g. of water while the other contains a monomer emulsion prepared from 417 g. H₂O, 63 g. of a 70% solution of t-octylphenoxypoly(40) ethoxyethanol, 280 g. dimethylaminoethyl methacrylate, and 520 g. n-butyl acrylate.

The initiator and monomer feeds are adjusted to maintain the polymerization at 55–56° C. and requires one hour. The polymer dispersion contains 19.4% solids with a pH of 8.1. To 300 g. of this dispersion is added 11 g. (1 equivalent) of 37% HCl dissolved in 300 g. of H₂O. The polymer immediately becomes soluble whereupon 13.2 g. (1.25 equivalents) of epichlorohydrin is added. After 3 days at 25° C., amine titration confirms the absence of polymeric amine and therefore complete quaternization. The ambient pH of 6.5 of the polymer solution is adjusted to 2.0 with 6.0 g. of 37% HCl and an 11.7% solids solution is obtained.

The resulting polymer is beater-deposited at various levels on bleached sulfite pulp in the manner described in (1c) above and the final paper sheets tested for sizing efficiency by measuring the change of brightness of the underside of each sheet while it supports on its upper surface an excess of a commercially available permanent blue-black ink (Skrip No. 232). Ink resistance is reported in terms of the number of seconds it takes for this brightness to drop from 100% to 70%. The instrument is calibrated by using a white sheet to represent 100% brightness. Table 2 below tabulates this data.

TABLE 2

| Polymer, percent by weight on weight of dry pulp | Seconds to 70% reflectance, 1 day age | Cured (300° F. 5 min.) |
|---|---|---|
| 0.5 | 562 | 666 |
| 1.0 | 2,950 | 2,050 |
| 2.0 | 5,000 | 6,000 |

(3) A 22 liter 4-neck flask is fitted with thermometer, stirrer, condenser, and 4 addition funnels by means of appropriate adapters. The flask is charged with 6,000 g. of de-ionized H₂O and 25 ml. of 0.1% FeSO₄ solution. This solution is degassed with a nitrogen purge and heated to 65° C. The addition funnels (a, b, c, d) are charged in the following manner: (a) a solution of 1,200 g. dimethylaminoethyl methacrylate, 735 g. 37% HCl, and 735 g. de-ionized H₂O (b) 1,200 g. of methyl acrylate (c) a solution of 12 g. of ammonium persulfate in 900 g. of H₂O and (d) a solution of 12 g. of sodium metabisulfite in 900 g. of H₂O. Solutions a, c, and d are added uniformly over a 90-min. period whereas solution b is added over a 60-min period. The rate is such that the temperature is maintained at 65° C. The polymer solution is cooled to 25° C. and 2,330 g. of H₂O is added to provide a 19.3% solids solution. The solution is stirred and 885 g. (1.25 equivalents) of epichlorohydrin is added. After 16 hrs. at 25° C. the reaction is complete as judged by lack of amine titer. This 23.8% solids polymer solution is adjusted to pH 2 with 20 g. of 37% HCl.

(4) A flask fitted with a thermometer, stirrer and an addition funnel is charged with 2,000 g. of de-ionized H₂O and 962 g. of 37% HCl. A supply of dimethylaminoethyl methacrylate (1,570 g.) is gradually added and the temperature maintained at 25° C. with external cooling. The epichlorohydrin (1,000 g.) is added all at once and the temperature maintained at 25–30° for 8 hours. Amine titration of this solution confirms the quaternization of the amine function. The 51.6% solution of quaternary monomer (Br No.=31.0, calcd. 28) is essentially entirely (>99%) in chlorohydrin form (Formula III) (thiosulfate/oxirane≦1%) and is utilized as a solution.

(5) A 1,000 ml. 4-neck flask is fitted with a reflux condenser, thermometer, stirrer and 4 addition funnels by means of appropriate adapters. The flask is charged with 645 g. de-ionized H₂O and 1 ml. of 0.2% FeSO₄ solution and heated to 50° C. while being purged with nitrogen. The 4 addition funnels (a, b, c, d) contain: (a) 50 g. of methyl acrylate; (b) 250 g. of a 20% solution of the quaternary monomer obtained in (4) above; (c) 2 g. of ammonium persulfate dissolved in 25 g. H₂O; and (d) 2 g. sodium metabisulfite in 25 g. of H₂O. The additions are carried out over 0.5 hr. to maintain the temperature at 48–50° C. The completely soluble resin copolymer at 12.7% solids is adjusted to pH 2 with 2 g. of 37% HCl.

(6) A polymerization flask fitted with a stirrer, condenser and thermometer is charged with 200 g. of a 33.2% solution of the monomer of (4) above. The following initiator system is rapidly added: 0.4 ml. of a 0.1% FeSO₄ solution, 0.8 g. ammonium persulfate, and 0.8 g. sodium hydrosulfite. The exotherm begins immediately and polymerization is complete within 0.5 hr. The solution is diluted with 133 g. of H₂O to 17% solids and the pH is adjusted to 2 with 1 g. of 37% HCl.

(7) A reaction vessel similar to those previously described is charged with 632 g. of H₂O and 2 ml. of 0.1% FeSO₄ solution. This solution is heated to 70° C. and purged with nitrogen. The supply containers of all 4 (a, b, c, d) addition funnels are charged in the following manner: (a) a solution of 2.0 g. of ammonium persulfate in 50 g. of H₂O; (b) 2.0 g. of sodium metabisulfite dissolved in 50 g. of H₂O; (c) a monomer mixture of 90 g. of dimethylaminoethyl acrylate and 100 g. of methyl acrylate; and (d) 67.2 g. of 37% hydrochloric acid. The kettle is then primed with 7 ml. of the HCl solution and 5 ml. of the initiator solution. All the remaining solutions are gradually added over a 1-hr. period such that the temperature is maintained between 69 and 71° C. An additional 10 g. of dimethylaminoethyl acrylate is then added over a 5-min. period. The completed solution polymer has a pH of 3.1 at 23.7% solids. A 300 g. sample of this solution is diluted with 100 g. of H₂O and 23.6 g. (1.25 equivalents) of epichlorohydrin is added. After 18 hours at 25°, amine titer confirms complete quaternization whereupon 4.9 g. of 37% HCl is added to provide the final resin or polymer solids at 22.4% solids at pH 3.8.

(8) A polymerization flask fitted with three addition funnels is charged with 148 g. of H₂O and sparged with nitrogen while being heated to 55° C. The 3 funnels (a, b, c) are charged as follows: (a) a solution of 0.4 g. of sodium metabisulfite in 10 g. of H₂O; (b) a solution of 0.4 g. of ammonium persulfate in 10 g. of H₂O; and (c) a monomer emulsion consisting of 8 g. methyl methacrylate, 12 g. of N,N-dimethylaminoethoxyethyl methacrylate, 10 g. of H₂O and 1.4 g. of a 70% solution of tert-octylphenoxypoly(40)ethoxyethanol. The solutions are gradually added over a 50-minute period to maintain the temperature at 55° C. Upon completion of the polymerization, a solution of 5.75 g. of 37% HCl in 300 g. of H₂O is slowly added. The dispersion immediately clarified to provide a 4.4% solids solution. To this solution (100 g.) is added 100 g. of H₂O and 1.29 g. of epichlorohydrin. Within 10 days at 25° C. the quaternization is complete and the 2.6% solids solution is then adjusted to pH 3 with 37% HCl.

(9.) The previously described polymerization flask is charged with 608 g. of H₂O and 2 ml. of 0.1% FeSO₄ solution. The contents are purged with nitrogen while being heated to 70° C. The 4 addition funnels (a, b, c, d) are charged as follows: (a) a solution of 2.0 g. of ammonium persulfate in 50 ml. of H₂O; (b) a solution of 2.0 g. of sodium metabisulfite dissolved in 50 ml. of H₂O; (c) a monomer mixture of 100 g. of dimethylaminoethyl methacrylate and 100 g. of methyl acrylate; and (d) a solution of 31.8 g. of concentrated H₂SO₄ dissolved in 60 g. of H₂O. The additions are complete within an hour to provide a clear 22.9% solids polymer solution at pH 3.0. The polymer solution (300 g.) is treated with 22 g. of epichlorohydrin and quaternization is complete within 3 days at 25° C. The final resin at 26.8% solids is adjusted to pH 2 with H₂SO₄.

(10) Five percent aqueous solutions are prepared, as described in the first two sentences of (1b) hereinabove, of each of the following products:

(1) Polymer obtained in (1a) above
(2) Polymer obtained in (2) above
(3) Polymer obtained in (3) above
(5) Polymer obtained in (5) above
(6) Polymer obtained in (6) above
(7) Polymer obtained in (7) above
(8) Polymer obtained in (8) above
(9) Polymer obtained in (9) above The resulting alkaline solutions are applied to paper pulp at various levels in the manner described in (1c) above and papers are formed therefrom with the results given in Table 3.

TABLE 3

| Polymer | Polymer, percent (wt.) based on dry pulp (wt.) | Sheet basis weight, lb./3,000 sq. ft. | Wet tensile (lb./in.) 1-day | Wet tensile (lb./in.) 28-days |
|---|---|---|---|---|
| Control | 0 | 38 | 0.5 | 0.5 |
| 1 | 0.25 | 38 | 7.4 | 8.6 |
|   | 0.50 | 38 | 9.9 | 11.0 |
|   | 1.00 | 38 | 12.5 | 14.4 |
| 2 | 0.25 | 38 | 6.6 | 7.0 |
|   | 0.50 | 38 | 8.8 | 9.5 |
|   | 1.00 | 38 | 9.6 | 9.8 |
| 3 | 0.25 | 38 | 6.1 | 7.1 |
|   | 0.50 | 38 | 8.4 | 9.9 |
|   | 1.0 | 38 | 12.0 | 14.5 |
| 5 | 0.25 | 38 | 4.9 | 5.9 |
|   | 0.5 | 38 | 6.7 | 7.5 |
| 6 | 0.25 | 38 | 7.8 | 7.9 |
|   | 0.50 | 38 | 9.6 | 10.3 |
| 7 | 0.25 | 38 | 3.1 | 3.4 |
|   | 0.50 | 38 | 4.0 | 5.2 |
| 8 | 0.25 | 38 | 4.2 | 5.1 |
|   | 0.50 | 38 | 5.6 | 6.2 |
| 9 | 0.25 | 38 | 3.9 | 4.7 |
|   | 0.50 | 38 | 4.6 | 5.6 |

(11) There is charged to a glass reaction vessel 978 g. of H₂O and 2 ml. of 0.1% FeSO₄ solution. This solution is purged with nitrogen and heated to 70° C. The 3 addition funnels (a, b, c) are charged as follows: (a) 5.3 g. of ammonium persulfate dissolved in 56 g. of H₂O; (b) a solution of 5.3 g. of sodium metabisulfite in 56 g. of H₂O; and (c) a monomer emulsion consisting of: 100 g. of styrene, 100 g. of methyl methacrylate, 15.3 g. of a 70% solution of Triton tert-octylphenoxypoly(40)ethoxyethanol, and 130 g. of the 51.6% copolymer solution obtained in (4) above.

The additions are conducted concurrently such that the exotherm maintains the temperature at 70° and requires 2 hours. The completed copolymer dispersion is of 19.6% solids (20% theoretical) and has a viscosity of 5 centipoises.

We claim:

1. A method comprising reacting an epihalohydrin of the formula

XCH₂—CHCH₂O wherein X is chlorine, bromine, or iodine with a polymer of an amine salt of the formula

H₂C=C(R)C(O)O—A—N(CH₃)₂·HY wherein R is hydrogen or methyl and
A is a (C₂–C₆) alkylene group having at least two carbon atoms in a chain between the adjoined O and N atoms or A may be a polyoxyethylene group of the formula (CH₂CH₂O)ₓCH₂CH₂ wherein x is 1 to 11 or more, and
Y is an anion at room temperature to 80° C. in an aqueous medium at a pH of 2 to 6.

2. A composition obtained by the process of claim 1.
3. A method of preparing a polymer comprising reacting a polymer of an amine salt with an epihalohydrin according to claim 1 and then bringing the resulting polymer composition at a solids concentration of about 2% to about 10% to a pH of 9 to 12 and maintaining it at that pH for 1 to 5 hours at 5–50° C.
4. A method according to claim 1 wherein the epihalohydrin is epichlorohydrin.
5. A composition obtained by the process of claim 4.
6. A method of adapting for use, as in making paper and the like, a copolymer of
(1) about 0.25% to 99.5% by weight of a monomeric material comprising a predominant amount of a compound of the formula

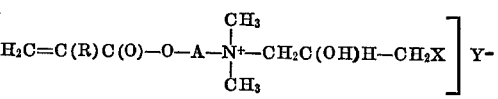

and a compound of the formula

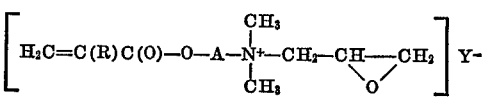

the symbols in the two formulas being defined as
R is hydrogen or methyl,
X is iodine, bromine, or chlorine,
A is a (C₂—C₆) alkylene group having at least two carbon atoms in a chain between the adjoined O and N atoms or A may be a polyoxyethylene group of the formula (CH₂CH₂O)ₓCH₂CH₂ wherein x is at least 1, and
Y is an anion, the latter compound being present in an amount up to about one-third the weight of the former with
(2) at least one other monoethylenically unsaturated monomer having a group of the formula H₂C=C<
by bringing the copolymer at a solids concentration of about 2% to about 10% to a pH of 9 to 12 and maintaining it at that pH for 1 to 5 hours at 5–50° C.
7. A composition obtained by the process of claim 3.
8. A method according to claim 6 wherein X is chlorine.
9. A composition obtained by the process of claim 8.

References Cited

UNITED STATES PATENTS 3,418,301  12/1968  Spivey _____ 260—486 X
3,497,482  2/1970   Hwa _____ 260—486 X HARRY WONG, Jr., Primary Examiner U.S. Cl. X.R.

117—124, 132, 140, 142, 148, 155, 169; 162—168; 260—28.5, 78.5, 79.3, 79.7, 85.5 ES, 86.1 N, 86.3, 86.7, 88.3 A, 89.5 N, 89.7, 348, 486, 847, 897, 898, 901